T. F. GLENN.
ARTIFICIAL TOOTH.
APPLICATION FILED FEB. 7, 1916.

1,216,107. Patented Feb. 13, 1917.

Inventor
Thomas F Glenn,

Witness
By
Attorney

UNITED STATES PATENT OFFICE.

THOMAS F. GLENN, OF ARDMORE, PENNSYLVANIA, ASSIGNOR TO THE S. S. WHITE DENTAL MANUFACTURING COMPANY, A CORPORATION OF PENNSYLVANIA.

ARTIFICIAL TOOTH.

1,216,107.      Specification of Letters Patent.      Patented Feb. 13, 1917.

Original application filed March 17, 1915, Serial No. 14,886, (now Patent No. 1,170,630.) Divided and this application filed February 7, 1916. Serial No. 76,576.

*To all whom it may concern:*

Be it known that I, THOMAS F. GLENN, a citizen of the United States, and a resident of Ardmore, county of Montgomery, State of Pennsylvania, have invented certain new and useful Improvements in Artificial Teeth, of which the following is a specification, reference being had to the accompanying drawings.

My invention relates particularly to that class of artificial teeth which are arranged to be attached to a plate or mounting, and is directed especially to the form of the retention.

The principal objects of my invention are, to provide an artificial tooth that is of simple construction, inexpensive to manufacture, readily connected, and of maximum strength, being a division of my application Serial No. 14,886, filed March 17, 1915.

My invention also includes all of the various novel features of construction and arrangement hereinafter more definitely specified.

Figure 1:
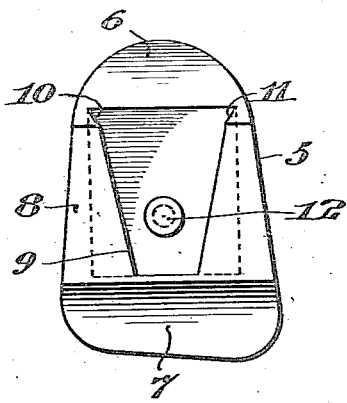
Figure 2:
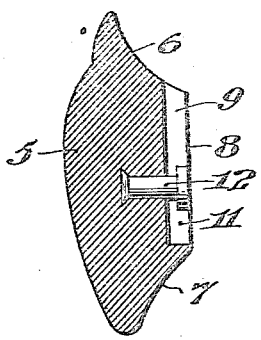
Figure 3:
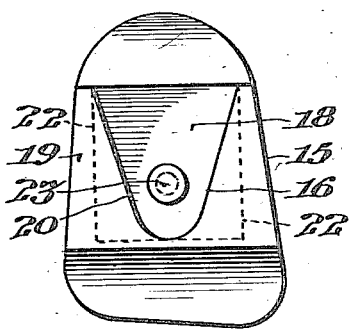
Figure 4:
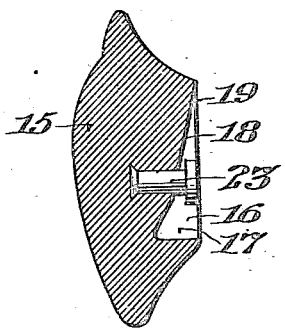

In the accompanying drawings, Figure 1 is a rear elevational view of an artificial tooth embodying a convenient form of my invention; Fig. 2 is a central vertical longitudinal sectional view of the tooth shown in Fig. 1; Fig. 3 is a rear elevational view of a tooth similar to the tooth shown in Fig. 1, but embodying a slight modification of its structure; Fig. 4 is a central vertical longitudinal sectional view of the tooth shown in Fig. 3.

In the form of my invention shown in Figs. 1 and 2, the tooth body 5 having the "ridge-lap" 6, "bite" 7, and the intermediate "shut" 8, is provided with a recess 9 in its lingual face, whose lateral walls 10 and 11 are undercut and provide a pocket on either side of the tooth, which deepens toward the incisive end and affords space for receiving the backing material, which broadens toward the region where the greatest strain is brought to bear.

As best shown in Fig. 1, the opening of the recess 9 in the lingual face of the tooth body 5 has its lateral edges diverging toward the gingival end of the tooth and is preferably open at said gingival end to afford ample space for the entrance of the backing material.

The artificial tooth thus constructed may be provided with further retaining means in the form of a projection extending lingually within said recess 9, and may be in the form of a unitary protuberance composed of the material of which the tooth is formed, or it may be in the form of a pin 12 of any suitable material or metal, baked or otherwise secured therein, and, as shown in Fig. 1, said pin is embraced laterally by the undercut shoulders.

In the form of my invention shown in Figs. 3 and 4, the tooth body 15 is provided with the recess 16 having its boundary walls 17 undercut and its inner or labial wall 18 having selected regions sloping inwardly at varying angles with respect to the lingual surface 19 of the tooth, and having the lingual edges 20 of its boundary wall 17 curvedly connected and diverging gingivally, and the labial edges 22 extending in substantially parallel relation with each other and terminating gingivally at substantially the point of termination of the inner wall 18. This form of my invention may be provided with a projection 23 extending lingually in said recess.

This invention is advantageous in that the tooth is so formed that when connected with the mounting, such mounting is afforded a broad bulk of material extended into the recess in the tooth body, and the independent laterally deepening pockets provide for substantial wings projecting laterally from the bulk of material which extends into said recess, and as said pockets broaden toward the gingival end of the tooth they form anchorages which broaden toward the gingival end of the tooth and thereby strengthen it against the natural labial strains at the gingival end.

I do not desire to limit my invention to the precise details of construction and arrangement herein set forth, as it is obvious that various modifications may be made therein without departing from the essential features of my invention as defined in the appended claims.

Having thus described my invention, I claim:

1. A tooth adapted for vulcanite work, having a projection extending from its lingual face embraced upon three sides laterally and incisively by shoulders, two of which are undercut and broaden toward the incisive end.

2. A tooth adapted for vulcanite work, having in its lingual face a recess forming independent pockets which deepen laterally toward the incisive end and whose lingual walls form laterally disposed undercut shoulders.

In witness whereof, I have hereunto set my hand this fifth day of February, A. D. 1916.

THOMAS F. GLENN.

Witnesses:
WILLIAM J. RUSSELL,
CLIFTON C. HALLOWELL.